Figure 1:
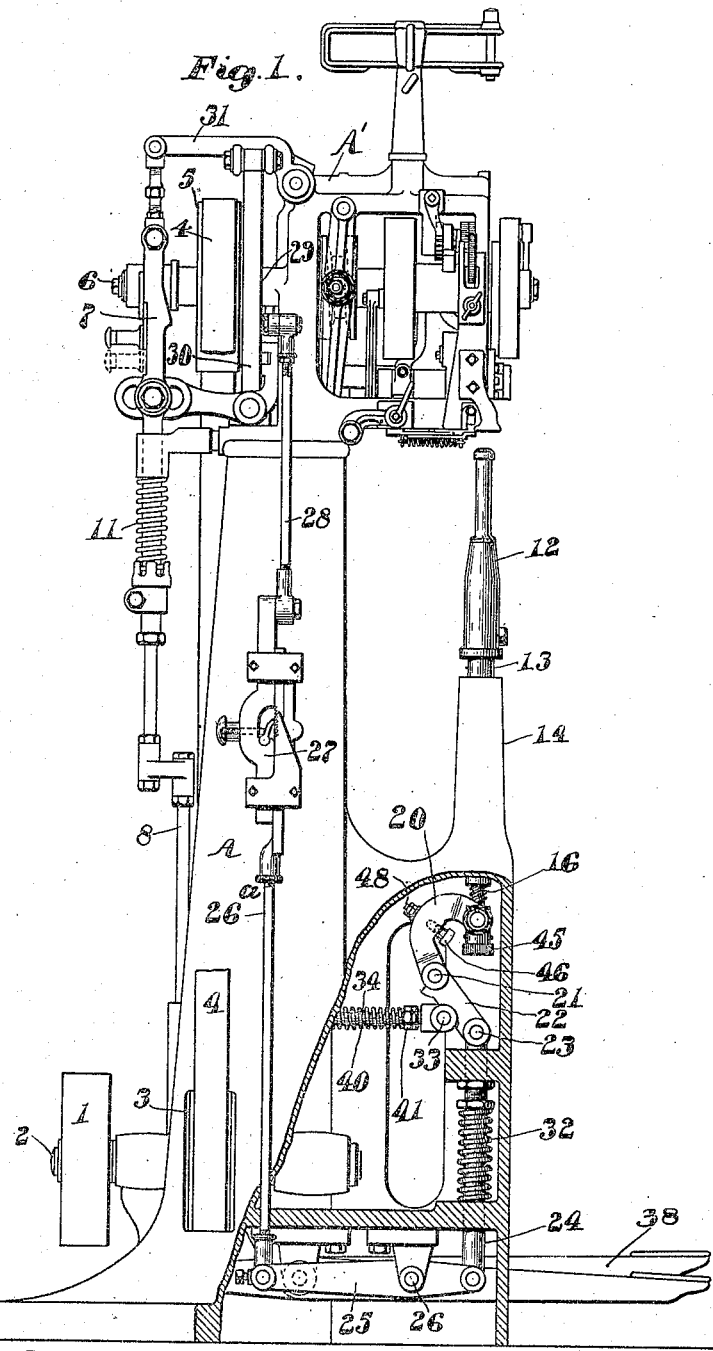

M. D. PHELAN.
WORK SUPPORT FOR METALLIC FASTENING MACHINES.
APPLICATION FILED MAY 29, 1906.

945,342.

Patented Jan. 4, 1910.

6 SHEETS—SHEET 1.

Witnesses:
Edwin T. Luce
Adolph C. Kaiser

Inventor:
Merton D. Phelan
by Emery & Booth
Att'ys.

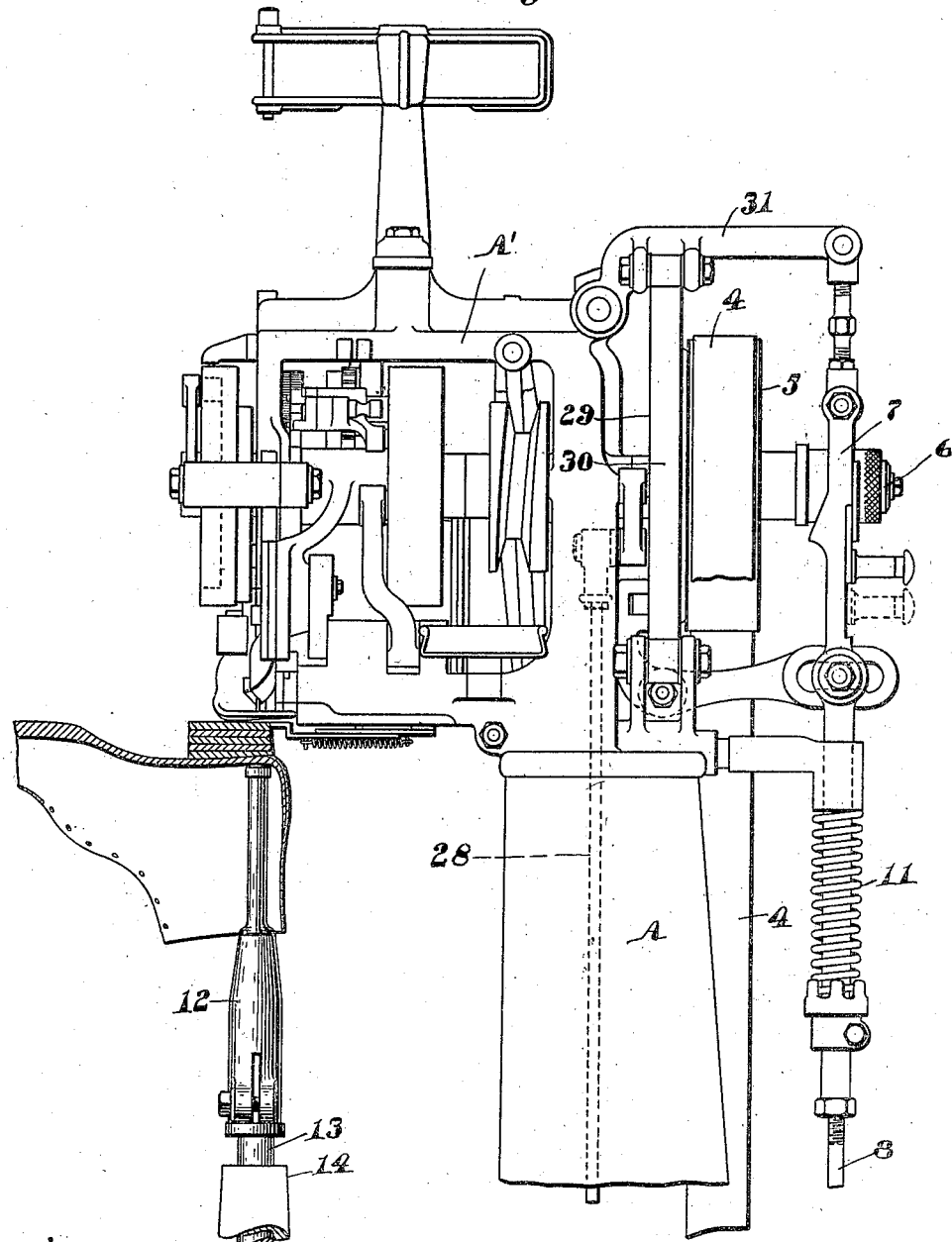

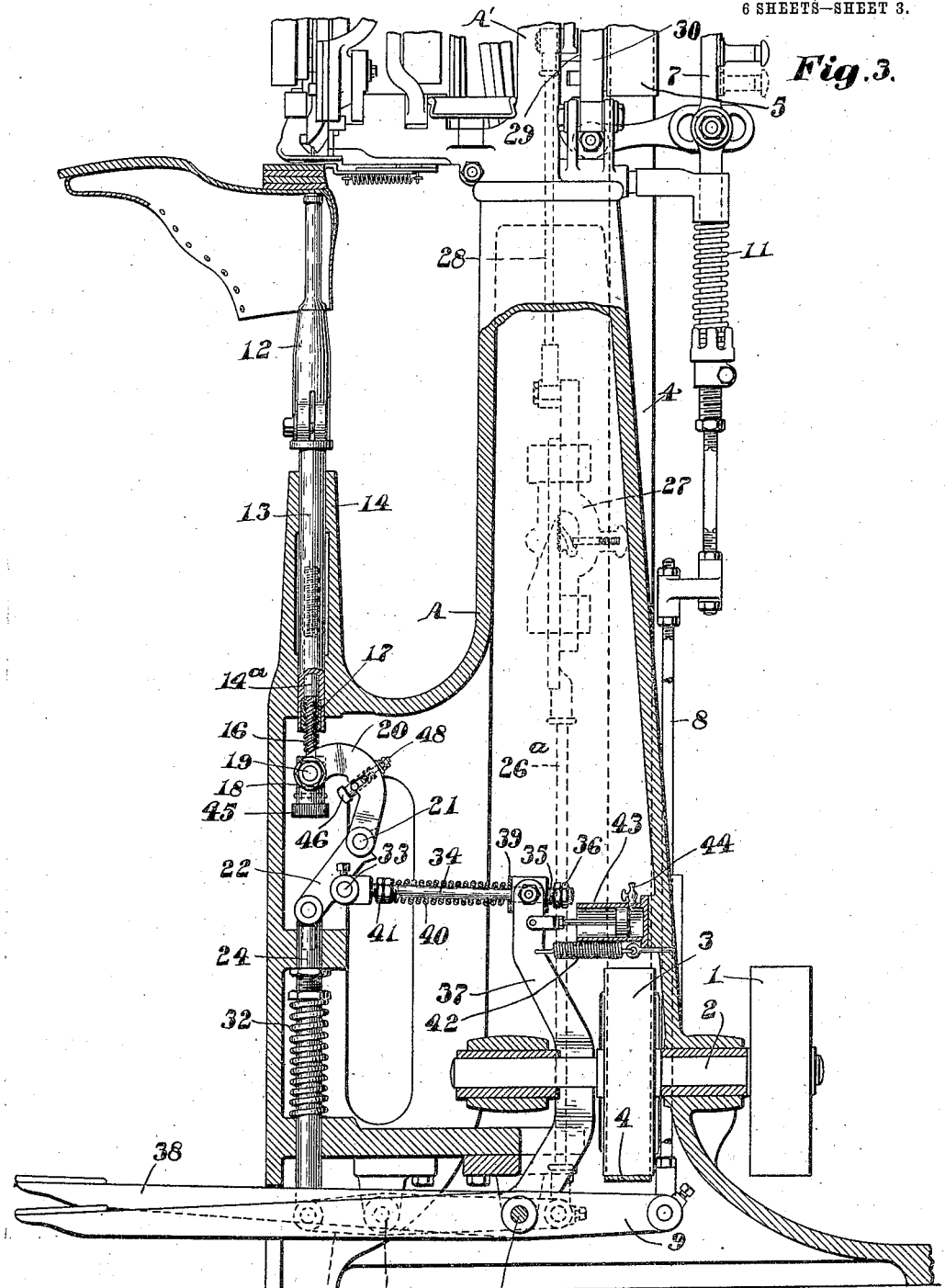

M. D. PHELAN.
WORK SUPPORT FOR METALLIC FASTENING MACHINES.
APPLICATION FILED MAY 29, 1906.

945,342.

Patented Jan. 4, 1910.
6 SHEETS—SHEET 4.

Witnesses:
Edwin T Luck
Adolph C Kaiser

Inventor:
Merton D Phelan
by Emery Booth,
Atty's.

M. D. PHELAN.
WORK SUPPORT FOR METALLIC FASTENING MACHINES.
APPLICATION FILED MAY 29, 1906.

945,342. Patented Jan. 4, 1910.

Witnesses:
Edwin T Luck
Adolph C Kaiser

Inventor:
Merton D Phelan
by Emery Booth
Atty's.

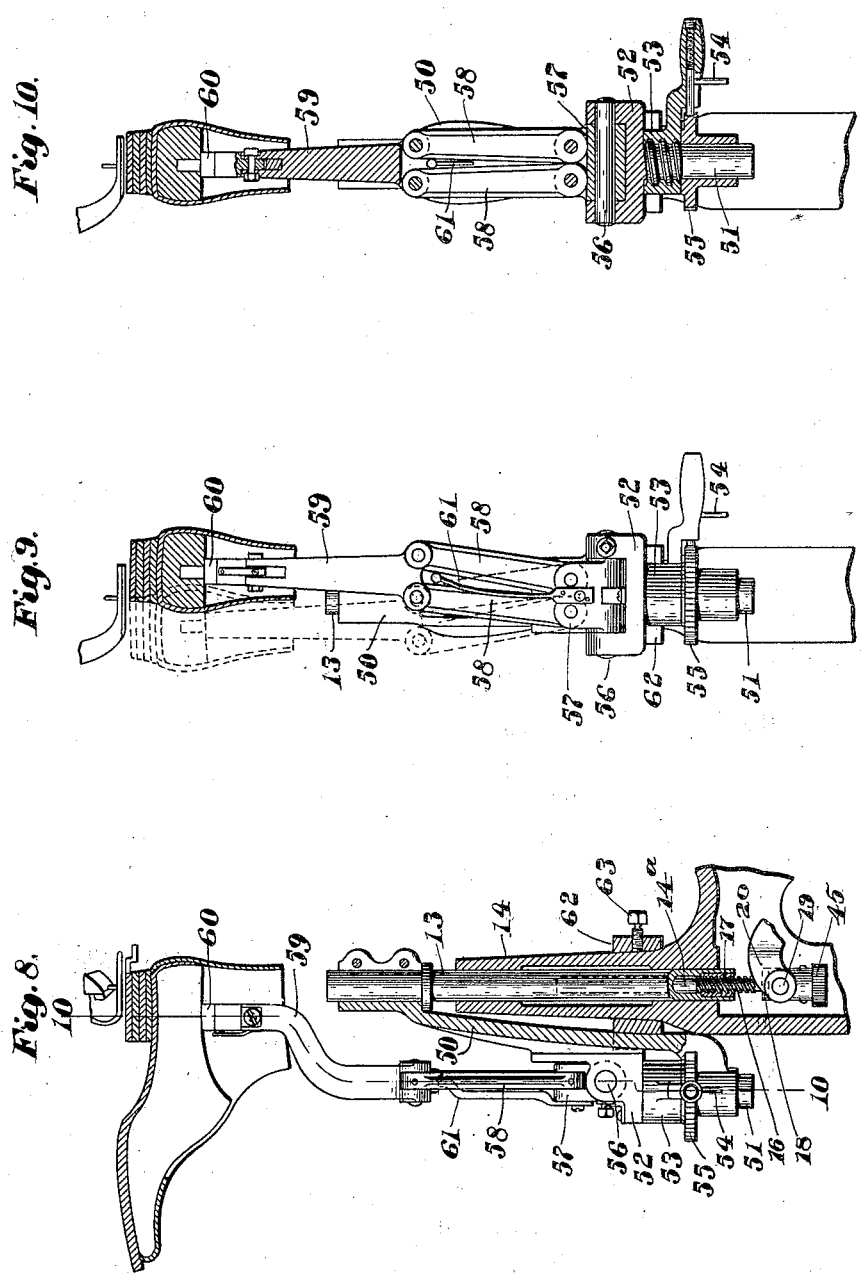

UNITED STATES PATENT OFFICE.

MERTON D. PHELAN, OF BOSTON, MASSACHUSETTS, ASSIGNOR, BY MESNE ASSIGNMENTS, TO THOMAS G. PLANT, OF BOSTON, MASSACHUSETTS.

WORK-SUPPORT FOR METALLIC-FASTENING MACHINES.

945,342. Specification of Letters Patent. Patented Jan. 4, 1910.

Application filed May 29, 1906. Serial No. 319,262.

*To all whom it may concern:*

Be it known that I, MERTON D. PHELAN, a citizen of the United States, residing at Boston, in the county of Suffolk, State of Massachusetts, have invented an Improvement in Work-Supports for Metallic-Fastening Machines, of which the following description, in connection with the accompanying drawings, is a specification, like characters on the drawings representing like parts.

This invention relates to metallic fastening machines employed in the manufacture of boots and shoes. In machines of this class as heretofore constructed, notably in connection with what are known as "loose nailers" and "sluggers", it has been common to provide a work supporting horn with means for depressing the same slightly and periodically between the driving of successive fastenings, in order to free the work slightly for the more ready feeding of the same, said horn being pressed upward yieldingly just prior to the driving of each fastening, so as to furnish a sufficient support for the work to resist the blow. While this slight periodical depression of the horn is sufficient to permit the feeding of the work, after the latter has been placed in position on the horn, and while the machine, when stopped, after having driven the last fastening, would of course leave the horn slightly depressed, yet this slight depression has been insufficient to enable the work to be freely removed from the horn or placed in position thereon. Because of this it was first customary to provide the horn with a special treadle by which it could be abnormally depressed to permit the work to be positioned and again abnormally depressed for the removal of the work. This required a separate operation on the part of the operative, and led to the introduction of means for automatically providing for abnormal depression of the horn after the last fastener had been driven and just prior to the stopping of the machine. To accomplish this the starting and stopping mechanism was connected with the horn depressing mechanism, so that when the starting and stopping mechanism was operated or released to stop the machine, the horn would by the same movement be abnormally depressed to permit the removal of the work. Again, when the starting and stopping mechanism was operated to start the machine, it would at the same time restore the horn to its elevated position, thereafter to be periodically depressed but slightly to permit necessary feeding of the work. The starting and stopping mechanisms of machines of this type are ordinarily coupled to or controlled by the main shaft of the machine in such manner that they can only be operated to stop the machine at the end of a complete revolution of said main shaft, so as to insure complete driving of the last fastening, and, of course, if the horn depressing mechanism be connected with the starting and stopping mechanism, or with the main shaft, it likewise would be abnormally depressed only at the close of the last revolution of the main shaft and after the last fastening had been driven. Coupling the horn depressing mechanism to the starting and stopping mechanism or to the main shaft of the machine, is, however, more objectionable in that the horn is invariably depressed at a given time, which, in some lines of work, is later than need be, and in other lines of work somewhat earlier than should be for the best results.

My invention aims to provide a novel and improved mechanism for depressing the work support which shall be wholly free and independent of both the starting and stopping mechanism and also of the main shaft of the machine, yet one which while insuring support of the work support until the last fastening is driven, will at the same time permit the work support to be depressed immediately after said fastening has been driven or at the end of any desired delayed interval thereafter.

In machines of this character where periodical depression of the work support or horn for feeding is uniform, it is necessary frequently to adjust the level of the work support, according to the average thickness of the work for the time being to be nailed, and for this purpose it has been customary to provide a wheel or lever adjustment at the base of the horn which the operative first adjusts and then starts the machine. All this requires time and my invention therefore aims to provide automatic means for adjusting the work support level to the thickness of the work place thereon and without in any manner interfering with the operation of the periodical depressing means for said work support or the final depressing means to depress the support for removal of the work.

My invention further contemplates the provision of a novel form of work support comprising in the embodiment of my invention herein selected for illustration an oscillatory jack having a new and peculiar movement, so that the work may be moved toward and from a work or operating device of the machine, without unnecessary tipping and to maintain the work supported on said jack in an approximately horizontal position.

All of the above, however, with other features of my invention, will be best understood from a description of a machine illustrating one embodiment of my invention and which is shown in the accompanying drawings.

Figures 4, 6:
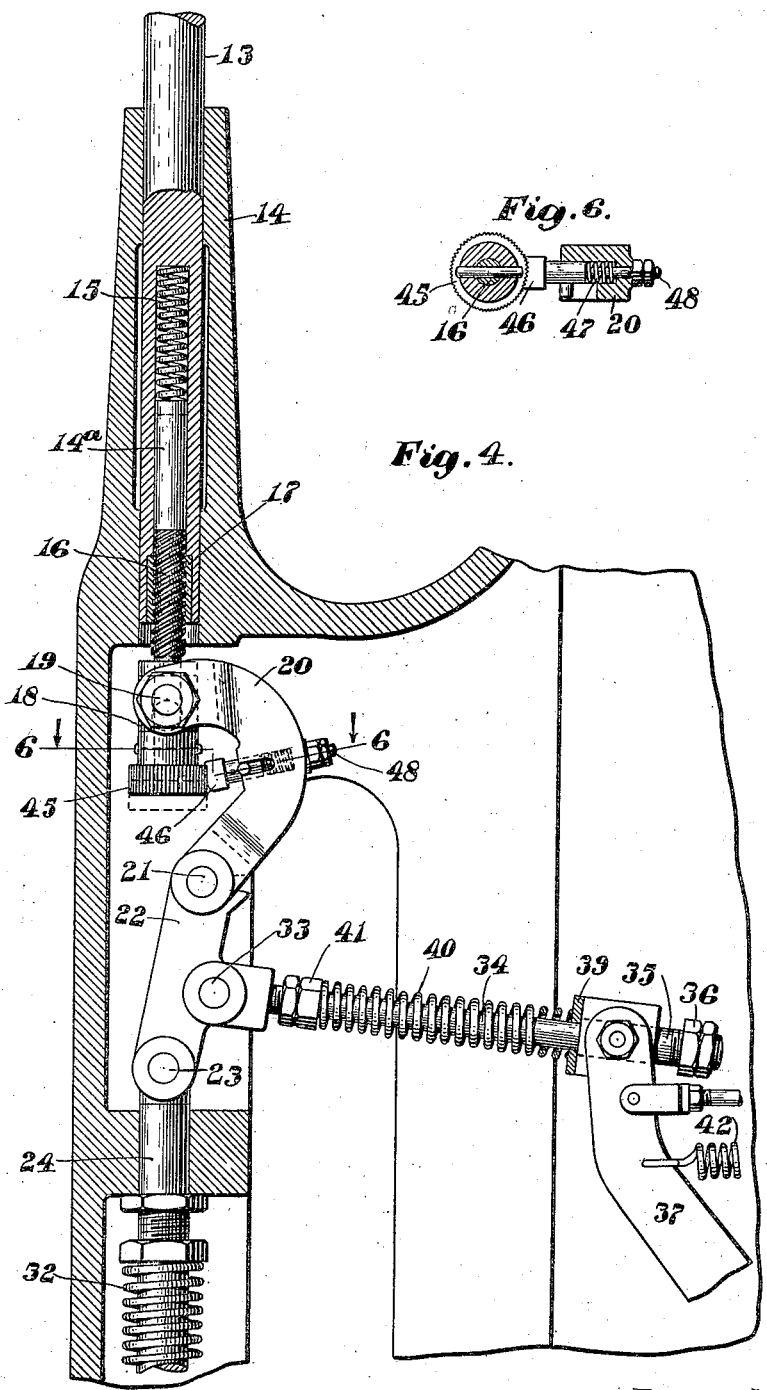
Figure 7:
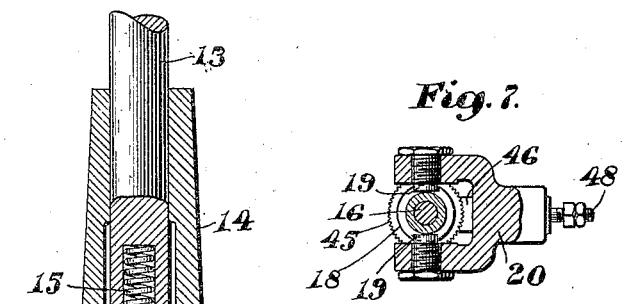
Figure 5:
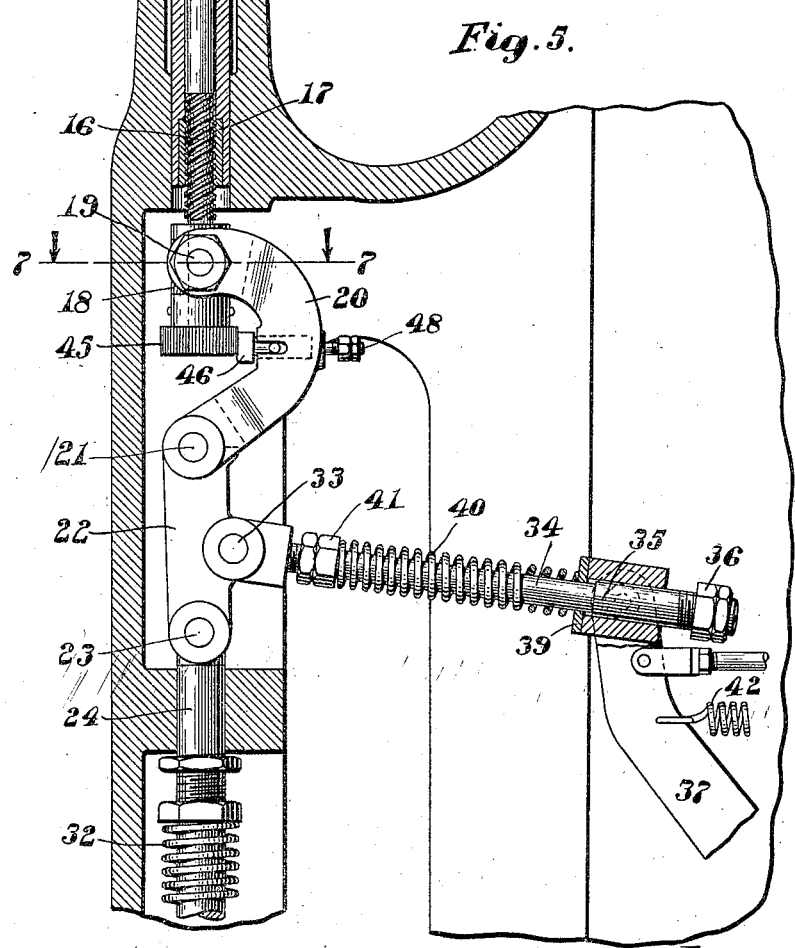

In the drawings,—Figure 1, in side elevation, partially broken away, illustrates a metallic fastening machine of the slugger type equipped with devices illustrating my invention; Fig. 2, an enlarged view of the head looking from the opposite side of the machine (Fig. 1), a shoe being shown in section in position upon the horn; Fig. 3 is an enlarged sectional view of the machine column, horn and horn supporting mechanism; Figs. 4 and 5, sectional details on a still larger scale illustrating the operation of the horn mechanism; Figs. 6 and 7, sectional details respectively on the dotted lines 6—6 and 7—7 (Figs. 4 and 5); Fig. 8 is a partial sectional view and elevation showing a novel form of jack made in accordance with my invention; Fig. 9, a left-hand or front view of the parts shown in Fig. 8; and, Fig. 10, a partially sectional view on the line 10—10, Fig. 8.

In the particular embodiment of my invention selected for illustration herein and shown in the drawings, referring first to Figs. 1 and 2, the machine column A, the machine head A', and the various working parts thereof may be of any desired type or construction, the same as herein shown illustrating a machine of the general type illustrated by U. S. Letters Patent No. 563,478, to which reference may be had.

The machine is operated (see Fig. 1) from a driving pulley, 1, fast on a counter-shaft 2, journaled in the column and provided with a second pulley 3, connected by a belt 4, with an overhead pulley 5, on the main shaft 6, of the machine. This pulley 5, in accordance with the usual practice in machines of this type, is adapted to be connected with its said shaft through the medium of suitable clutch mechanism under the control of a rising and falling wedge 7, which, when raised, renders said clutch effective to drive its said shaft and the machine; and when dropped, renders it ineffective for the purpose.

Since mechanisms of this type are well known, particularly in this art, it is considered unnecessary further to describe the same herein, further than to say that said wedge is controlled by a rod 8, leading downward to and connected with the starting and stopping treadle 9 (see Fig. 3), fulcrumed at 10, in a suitable bracket provided therefor in the base of the column and with its tread end reaching outward from and at the front of said base. A spring 11, encircling the wedge rod 8, near its upper end, tends to depress the said rod and lift the treadle, so as to render the said clutch normally inactive, said wedge being held in raised position to render the clutch active against the action of this spring by depression of said treadle.

Referring now to Fig. 3: a work support or holder is provided, which may be of any suitable or desired shape and construction. As herein shown, said work support comprises a horn 12, mounted adjustably upon the upper end of a supporting rod 13, the latter being mounted to slide vertically in a tubular neck 14, rising from the front of the column base. This supporting rod (see Fig. 5) is also made tubular at its lower end, to receive the sliding pin 14ª, acted upon from above by a spring 15, that tends always to depress said pin. Immediately below said pin and acted upon constantly thereby is a supporting screw 16, in threaded engagement with a nut 17, fast in the lower end of said supporting rod. This screw has fast on its lower end a head 18, which (see Fig. 7) receives in a circular groove thereof the diametrically opposite pins or trunnions 19, in the forked end of a toggle link 20 so that said head 18 and connected screw 16 may rotate together relative to the forked end of the toggle link 20, when free from the locking device 46, as will hereinafter appear. This toggle link is crooked, as shown, and at its lower end is jointed at 21, to a coöperating toggle link 22, in turn jointed at 23, to the upper end of a toggle supporting rod 24, mounted to slide vertically in bearings in the column. At its lower end (see Fig. 1) said toggle supporting rod 24, is jointed to a lever 25, fulcrumed at 26, in a suitable bracket in the column base. The inner end of said lever 25, is jointed to a rod 26ª, which, through the measuring mechanism 27, is connected, by a rod 28, with a usual cam 29, on the main shaft of the machine. This cam operates in usual manner to lift the said rod to depress the horn periodically between the driving of successive fastenings, and, together with the measuring device 27, are of such well-known construction as to require no further detailed description herein.

Such a mechanism was first shown in U. S. Letters Patent to L. Goddu No. 265,227 dated September 26, 1882, to which reference may be had, if desired. The periphery of the cam 29, in the present instance and in accordance with the usual custom, serves as a brake wheel for a brake band 30 (Figs. 1–3), controlled by a lever 31, connected with the wedge 7; so that whenever the wedge is moved to release the clutch, the brake is at the same time applied to arrest the machine. Surrounding the toggle rod 24, and acting against an adjustable nut thereon, is a lifting spring 32, which tends normally to lift said work support or horn and work thereon to the machine.

To depress the horn abnormally at the end of a nailing operation and for removal of the work therefrom, the toggle 20—22 is broken or collapsed, and the horn is again raised to normal position by straightening of the toggle. For the purpose of breaking and straightening this toggle, one of the links thereof, 22 (see Figs. 4 and 5) has jointed to it at 33, a rod 34, having a shoulder end 35, upon the threaded extremity of which are lock nuts 36. Surrounding this shoulder end 35 of said rod, is the end of an upright arm 37, of a bell-crank treadle lever, fulcrumed at 10 (Fig. 3), coincident with the starting and stopping treadle and having its treadle 38, reaching forward close beside the starting and stopping treadle.

Encircling the reduced portion of the toggle operating rod 34 (see Fig. 5) is a washer 39, which is normally pressed against the shoulder 35, by a spring 40, encircling the rod and seated at its front end against suitable adjusting nuts 41. The distance between said washer 39 when seated against said shoulder and said nuts 36, is greater than the length of the end of the treadle lever 37, that encircles that end of the rod, so that a lost motion is provided in both directions of movement of said lever before its motion can be communicated to the rod. The treadle lever 37 is held normally in the rearmost position by a spring 42, connecting the same with the column (Fig. 3). Obviously, if the horn or work supporting treadle 38, be depressed, its upright arm 37, will, through the washer 39 and spring 40, operate to straighten the toggle and lift the work support. Conversely, if said treadle be released, its spring 42, will draw it to its original position, causing the end of said treadle arm 37, by the nuts 36 on the toggle rod, to move said toggle to collapse the toggle and drop the work support. The lost motion between the end of said treadle lever and the washer on one side, and the nuts at the opposite side, is provided for the purpose of causing a momentary lag or delayed action in the response of the toggle to the movement of the treadle lever, so that after the said treadle is released, a momentary delay occurs before the work support responds and drops.

Inasmuch as these machines are operated usually at from 250 to 350 revolutions per minute, which means the driving of as many fastenings per minute, it will be clear that the interval required for the making and driving of any single fastening, is approximately ¼ of a second or less, so that with the machine in operation and with the operative holding both the starting and stopping and the work supporting treadle depressed, as he is able to do, with one foot, by reason of their close proximity one to the other, when the end of the work is reached and at the moment of driving the last fastening, the operative releases both treadles, the starting and stopping treadle being held against lifting movement until the main shaft of the machine has completed its revolution and driven the last fastening, when it is automatically raised to stop the machine. The work supporting treadle, however, while released at the same time as the starting and stopping treadle, is in no manner connected with the starting and stopping treadle nor with the main shaft nor any other part of the machine; consequently, so far as those parts are concerned its work supporting treadle might immediately lift, and, unless means were provided to prevent, cause collapse of the toggle and depression of the work support perhaps before the last fastening had been completely driven. This premature depression of the work support or horn is, however, prevented in the present instance by the lost motion first referred to, between the treadle lever and the toggle rod, which is sufficient to cause a depression of the work support to lag behind the release of the treadle long enough to insure complete driving of the last fastening. This is of advantage as compared with earlier constructions where said treadle has been tied or connected to the starting and stopping mechanisms of the machine, because it permits of considerable latitude of adjustment, and, when the machine is running slowly, permits release of the work earlier than would be possible were the work support connected to and responsive only with the starting and stopping mechanism. On the other hand, with certain types of clutch mechanism it is desirable to release the same earlier in the period of the last rotation of the main shaft than it would be desirable to release the work support, and my improved mechanism permits this to be done, because the depression of said work support may be timed to a nicety.

Should the lag or delayed action of the work support as compared with the movement of its treadle, be desired to be greater than is conveniently possible, by means of the lost motion alone, I have provided the treadle lever with a retarding device, which (see Fig. 3) in its preferred form, as illustrated, is in the shape of a dash-pot 43, fast to the machine column and having its piston connected with said lever. This dash-pot, by means of its escape valve 44, may be adjusted to give any desired period of retardation to the treadle lever and thereby to the toggle. In the present instance of my invention, the lost motion and the dash-pot are so arranged as to be used together, and of course either of these devices may be used without the other when and where desired.

I believe I am the first to provide a machine of the character described, with a driving shaft, a work support having connections with the driving shaft for feeding, a starting and stopping treadle, and a treadle independent of the starting and stopping treadle for controlling the final depression of the work support and any means whatsoever for causing it to lag in its response to release of the treadle.

Referring, now, to Figs. 3, 4, and 5: I will describe the means for automatically measuring the lift of the horn to the thickness of the work independently of any measuring device connected with the periodical depressing mechanism. Fast upon the lower end of the supporting screw 16 and below the toggle supporting head 18, is a finely toothed wheel 45, and opposite this wheel the toggle link 20 is provided with a spring-pressed locking device 46 (see Fig. 6). The spring 47 behind this locking device presses the latter normally outward to a position limited by the stop nuts 48. When the toggle is collapsed with its links in the position shown in Figs. 1 and 3, the spring-pressed locking device 46 is removed from the toothed periphery of said wheel 45. If now the toggle be straightened, to lift the horn, it will operate to lift the screw 16 and the said supporting rod 13 and its work support, and the frictional resistance to the lifting of said support being less than that opposing the rotation of the screw in its nut 17, the whole structure, screw, nut, work support and all, will be lifted as a unit until the work meets the presser-foot of the machine. When, however, the lifting of the work is prevented by contact thereof with the said presser-foot, further movement of the toggle being unable to lift the work support but continuing to lift the screw, will cause the screw to turn in the supporting rod 13, until the toggle reaches its straightened position, just prior to which the spring-pressed locking device 46, will engage the toothed surface of the wheel 45 on the screw and will lock the said screw against further rotation. When, now, the periodical work support depressing mechanism operates, it will operate the toggle, toothed wheel, screw and work support as a unit, and just as it would operate the same if the toggle and the screw were omitted. If the work is exceptionally thick, then the lifting of the work support will be stopped earlier in its movement and the balance of the movement taken up in turning the screw will be greater. If the work is thin, the screw and the work support or horn will be lifted rapidly together, until the work engages the presser-foot, when further movement of the work support will be arrested and the screw compelled to turn as before. Thus the screw measuring device described, constitutes one form of measuring device for the work support when operated by the treadle to measure the work, so that the conditions of operation become uniform, whatever be the thickness of the work. This obviates any necessity for the operative manually adjusting the work support for different styles or kinds of work, as is now the custom, because said work support automatically measures and adjusts itself thereto, saving much time to the operative and increasing his output and wages.

The teeth on the locking wheel 45, are shown as V-shaped, and the co-action of the correspondingly shaped teeth of the spring-pressed locking device thereof, is therefore necessarily a frictional action or engagement, so that while the device is specifically one employing a locking device, to lock the work support in its measured condition or position, yet it is, broadly considered, one form of frictional measuring means and my invention comprehends the frictional measuring means broadly without limitation of type of means herein shown and described. The collapse of the toggle first releases the measuring lock, and a continuation of its movement depresses the work support, the depressing movement always permitting the screw to be restored by its spring 15, to its original position. As herein shown (see Figs. 4 and 6), the spring-pressed locking device 46, is adjustable toward and from said toothed wheel 45. By this arrangement said locking device is caused to engage with the toothed wheel prior to the straightening of the toggle links, arresting the rotation of said wheel 45, and causing a depression of the supporting rod 24, against the tension of its spring 32, during the final straightening of said toggle. Since the pawl or locking device 46, is adjustable, it will be seen that the pressure maintained by said spring 32, to cause the lifting of the work support against the work, can be adjusted or varied to suit the conditions of the work or to cause heavy or light pressure with the same thickness of stock, as may be desired.

In the foregoing description the mechanism involving parts of my invention has been shown in connection with a form of work support that is known in the trade as a "horn",—that is, a metallic work support upon which the shoe is placed without any last contained in the shoe. In many instances, however, particularly in the better grades of work, it is desirable to maintain the last in the shoe through all possible processes of shoe making, as the last always maintains the shoe in its desired and proper shape. I therefore desire it to be understood that by the term "work support" or work holder, as used in this description, is meant any suitable device on which work can be supported or retained, my invention not being limited to the employment of a shoe support, as, for example, the horn or the jack now to be described.

To equip a metallic fastening machine for operating upon shoes containing lasts, a work support or holder known as a jack, is employed, the same being provided with a spindle, adapted to enter the usual spindle hole in the heel of a last.

In rounding the heel of a shoe, because of the irregular shapes and sizes of heels, it is necessary for the spindle end of the jack to possess a swinging movement of considerable range and radius, but it has been found that if a jack be pivoted at a convenient point to permit such a movement, the swinging of the jack produces such inequality thereof as is detrimental to the best work.

In Figs. 8, 9 and 10, I have shown a jack construction, which I believe to be entirely novel and to possess great merit. Referring to said figures, the supporting rod 13 and its mount are and may be as in the construction described in connection with the preceding figures. Clamped to the upper end of said rod 13 and in place of the horn (Fig. 1), is the drop hanger 50, shaped to drop down outside the neck 14, to as low a point as is convenient and practicable. At its lower end said hanger is socketed to receive the vertical stem 51, of a head 52, which may be raised and lowered for hand adjustment by means of a nut 53, that surrounds the said stem and engages a threaded portion thereof (see Fig. 10). A handle for operating the nut is provided with a finger-controlled locking device 54, adapted to engage a ratchet surface 55, on the socketed end of the hanger for retaining the nut in any desired adjusted position. The head 52, is provided with a transverse pin 56, upon which is pivoted an auxiliary head 57, and to this auxiliary head are pivoted about axes substantially perpendicular to the axis of the pin 56, two nearly parallel links 58 (see Figs. 9 and 10). At their upper ends these links are jointed to the jack proper 59, carrying in turn at its upper end a usual spring-controlled and movable pin or post 60, adapted, as indicated, to enter the usual hole in the last carrying a shoe the heel of which is to be nailed.

It will be noticed by reference to Fig. 10, that the median lines of the two links 58, are shown as not quite parallel, but diverging slightly from their lower to their upper ends; so that as the jack is swung to the right into the position shown in Fig. 9, it does not move in a perfectly parallel direction, nor does it maintain its truly perpendicular position, but is given a gradual tipping movement at its upper end toward the direction of movement; so that the effect is as if the jack were pivoted at a point at or below the floor level, for example. By this arrangement the last and said jack are moved in a curvilinear path having a radius of curvature exceeding or greater than the length of the jack or the distance between its upper end and said head 52. This construction, furthermore, provides for or gives the free movement of a pivotally supported jack; all the effect of a low pivot and long radius to keep the work properly positioned relative to the driving mechanism as the work is shifted through a considerable range, coupled with a relatively compact mechanism concentrated around the neck described. As the jack is swung in the opposite direction, an opposite tipping movement is imparted to it. By varying the lengths of the links, the spread of the latter and the direction of spread, it is clear that any desired movement may be given to the jack from a truly vertical movement and perpendicular position, and a tipping and swinging movement in any desired direction and to any desired extent, so the work may be maintained in an approximately horizontal position and said jack substantially vertical or parallel with its central position. Between the links I have herein shown a centering spring 61 (Figs. 9 and 10), which exerts but little resistance to the side swing of the links, yet tends to center the latter when a last and its shoe are removed from the jack.

As herein shown, referring particularly to Figs. 9 and 10, it will be noted that said spring 61, has a T-shaped head, which rests freely between said links 58 when the latter are in a central or normally vertical position, but as said links are swung to one side of the shoe, the one or the other engages or presses against the T head of said spring, so that the latter acts as a stop to prevent further movement sidewise, as well as to return said links to their normal position.

The jack as a whole may be tipped forward toward the operative about the pivot pin 56, to facilitate positioning and removing the lasts to and from the jack. A permanent adjustment may be had by means of the threaded stem to the pivot head 52, described.

This jack may be used advantageously in connection with the work support measuring and drop mechanisms heretofore described, or, it may be used with any other desired form of jack or horn support and in connection with any machine to which it may be applicable.

Surrounding the neck is a positioning yoke 62, forked at its outer end to straddle the threaded nut adjusting device and itself provided at the back of the neck with a clamping screw 63, for holding it in desired rotative position. This yoke serves to prevent swinging movement of the jack about the vertical axis of the work support rod 13, yet permits the jack to be placed in any desired radial line, to cause the swing of the links to be always across the front and parallel with the operative or obliquely to him at either side, should occasion require.

The invention disclosed, both as to each type of work support or holder, and the treadle releasing mechanism and also as to the treadle operated measuring mechanism for said work support, is applicable to many machines of the type to which the invention relates, and the treadle releasing and measuring mechanisms may be independently used if desired, but when arranged for combined use, present cumulative advantages that are very desirable.

The invention economizes the time of the operative, facilitates the operation of the machine, furnishes a convenience of adjustment which is wholly lacking in other devices of the sort, while the horn or work support measuring means is, in so far as I know, entirely new. My invention, furthermore, is not limited to a shoe support in combination with each or all of the aforesaid depressing, measuring and retarding mechanisms, but contemplates the employment of any type of work support therewith.

Claims.

1. In a machine of the class described, the combination of a driving shaft, a work support, connections between the driving shaft and work support to operate the same for feeding, a starting and stopping treadle, a treadle, independent of the starting and stopping treadle, for controlling the final depression of the work support, and means between the treadle and work support for delaying the starting movement of the work support for final depression after the treadle has been manipulated to cause said final depression.

2. In a machine of the class described, a work support, and lifting and depressing means therefor provided with lost motion connection whereby response of the work support to the operation of said means is delayed, and a retarding device for said means.

3. In a machine of the class described a starting and stopping treadle, a work support controlling treadle, both arranged in juxtaposition to be depressed and also released simultaneously, and means to provide delayed response of said work support with relation to the controlling treadle when released as compared with said starting and stopping treadle when released.

4. In a machine of the class described, a work support, a treadle to lift the same, connections between said treadle and work support providing for a lost motion between them when the work support has reached the limit of its movement, and means thereafter to prevent lost motion during periods of operation of said machine.

5. In a machine of the class described, a work support, a lifter therefor, connections between the same and said work support to provide first for movement of the two together, and then, upon resistance to the work support movement, permit further movement of said lifter, and toothed means to lock said lifter and work support for further movement together.

6. In a machine of the class described, a work support, a lifter therefor, connections between the same and said work support to provide first for movement of the two together, and then, upon resistance to the work support movement, permit further movement of said lifter, and interlocking toothed means to lock said lifter and work support for further movement together.

7. In a machine of the class described, a work support provided with oscillatory means to permit said support to be moved laterally, said oscillatory means being constructed and arranged to tip the work support about a center noncoincident with the center of oscillation of said means.

8. In a machine of the class described, a work support connected with oscillatory means for adjusting it laterally, said means constructed and arranged to produce a gradual tipping movement of the part of said work support that holds the work, said tipping movement being less than the full tipping movement of the oscillatory means.

9. In a machine of the class described, a work holder, a support, and oscillatory means connected with said holder and support constructed and arranged to be tipped laterally and to cause the tipping of said holder a less amount than said means 10. In a machine of the class described, a work support provided with means to permit the work to be moved laterally in a curved path having a radius of curvature exceeding the length of said work support in combination with means for elevating or depressing said work support, and measuring means connected therewith, said elevating or depressing means being under the control of an operative.

11. In a machine of the class described, a jack, a support, oscillatory means comprising a plurality of links connected with said support and jack for permitting the same to be moved laterally, and yielding means normally to hold said jack in a central position.

12. In a machine of the class described, a jack, a support, and oscillatory means comprising a plurality of diverging links connected with said support and jack permitting the same to be moved laterally.

13. In a machine of the class described, a jack, a movable head, and links connecting said jack and head constructed and arranged to permit of lateral movement of said jack to maintain the latter in a substantially vertical position and a spring for normally maintaining said jack in central position.

14. In a machine of the class described, a jack, a movable head, and diverging links connecting said jack and head constructed and arranged to permit of lateral movement of said jack to maintain the latter in a substantially vertical position.

15. In a machine of the class described, the head 52, the auxiliary head 57 connected thereto, the jack 59, and the links 58 connecting the auxiliary head and jack constructed and arranged to permit the jack to be moved laterally and to maintain it in an upright position when so moved.

16. In a machine of the class described, the head 52, the auxiliary head 57 flexibly jointed thereto, the jack 59, the links 58 connecting the auxiliary head and jack, and the spring 61 tending to hold the jack in central position, substantially as shown and described.

In testimony whereof, I have signed my name to this specification, in the presence of two subscribing witnesses.

MERTON D. PHELAN.

Witnesses:
WILBURT D. JONES,
SIDNEY F. SMITH.